Jan. 2, 1968     A. STEINER     3,360,961
NON-ROTATABLE CONNECTION
Filed Dec. 3, 1963
FIG. 1
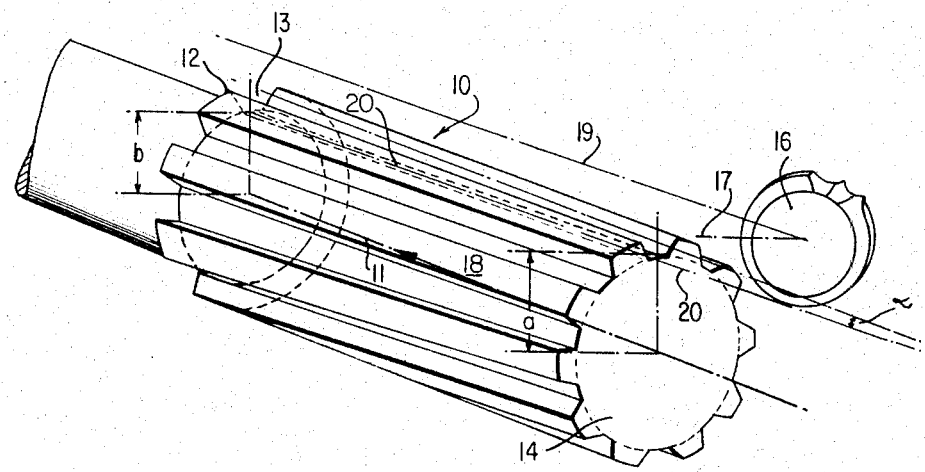
FIG 2
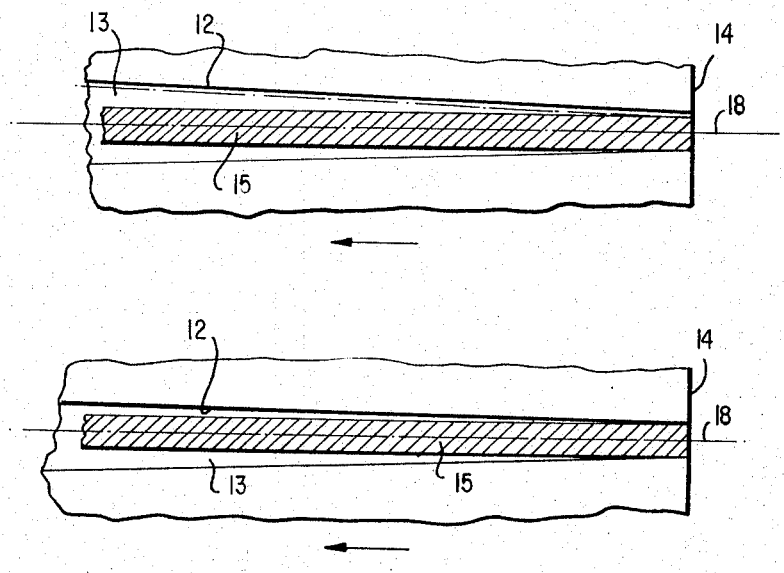
FIG. 3
INVENTOR.
ADOLF STEINER
BY *Dicke + Craig*
ATTORNEYS

United States Patent Office 3,360,961
Patented Jan. 2, 1968

3,360,961
NON-ROTATABLE CONNECTION
Adolf Steiner, Baden-Baden, Germany, assignor to Daimler-Benz Aktiengesellschaft, Stuttgart-Untertürkheim, Germany
Filed Dec. 3, 1963, Ser. No. 327,705
Claims priority, application Germany, Dec. 6, 1962, D 40,452
7 Claims. (Cl. 64—9)

The present invention relates to a tooth cross section or tooth profile for the connection of a cylindrical shaft with the hub of a gear or the like, especially for the non-rotatable connection of the axle shaft of a motor vehicle with a driving gear, whereby the teeth extend in the longitudinal direction of the shaft.

The axle shafts of motor vehicles are, as a rule, so dimensioned that in case of a shock-like starting as well as during other peaks of the torque stressing or loading the shaft, the axle shaft acts as torsion rod springs, that is, they twist or yield torsionally slightly and thus protect the drive unit from overloads. While, as a rule, the shaft itself is thereby twisted, this is not the case with a gear or pinion placed over a toothed zone of this shaft. With a normal tooth construction having teeth extending parallel to the shaft axis and remaining uniformly the same throughout, stress peaks occur as a result thereof above all within the zone of the entrance of the toothed profile of the shaft into the hub of the gear, for the shaft is held securely by the hub without any torsional possibility, so to speak of.

With the known tooth constructions of the type mentioned hereinabove which are subjected to a fatigue loading by a torque changing in magnitude and direction, fatigue and repeated stress failures therefore occur frequently in the profile end of the shaft.

The aim of the present invention is a form-locking non-rotatable connection between shaft and hub which eliminates repeated stress or fatigue failures of the shaft within the area of the toothed configuration. This aim is solved in accordance with the present invention, by so constructing and shaping the toothed profile or cross section of the type described hereinabove that the tooth gaps either of the shaft or of the hub are enlarged continuously along the shaft by the fact that the feed direction of the work tool utilized for the manufacture of these tooth gaps extends obliquely to the shaft axis.

As a result thereof with a corresponding selection of the oblique feed angle, there is achieved a continuously increasing flank play along the shaft in such a manner that only with the largest torque to be transmitted the tooth flanks of the toothed shaft abut continuously and throughout the entire length thereof against the tooth flanks of the hub. With a tooth construction by means of which a gear arranged at the end of a shaft is non-rotatably connected with the shaft, the width of the tooth gaps of the shaft or of the hub of the gear continuously decreases in accordance with the present invention in the direction toward this shaft end. As a result thereof, the shaft is able to twist unobstructedly over the entire length thereof; that is, also within the area of the teeth thereof by an amount corresponding to the torque to be transmitted. Consequently, a longer shaft piece is effectively available for the torsion of the shaft than if in the reverse the tooth gaps would attain the largest width thereof at the shaft end. In both cases, the flanks of the teeth of the shaft or of the hub come into abutment over an ever greater length simultaneously with increasing torque. The stress peaks that normally occur at the profile end of the toothed configuration of the shaft are therefore reduced by the construction of the shaft or hub teeth in accordance with the present invention.

Accordingly, it is an object of the present invention to provide a non-rotatable toothed connection between a shaft and a force-transmitting element such as the hub of a gear which avoids the drawbacks and shortcomings encountered with the prior art constructions.

Another object of the present invention resides in the provision of a non-rotatable connection between two parts transmitting torque which reduces the stress peaks that occur especially in case of sudden applications of large torques to one of the parts.

Still another object of the present invention resides in the provision of a non-rotatable connection by means of teeth between a shaft and a gear mounted over the shaft which effectively increases the length of the shaft that is able to twist for the reduction of localized peak stresses.

A further object of the present invention resides in the provision of a non-rotatable connection between a shaft and the hub of a gear by means of a toothed configuration which is so constructed as to minimize the danger of repeated stress or fatigue failures, particularly within the zone of entrance of the toothed profile of the shaft into the hub of the gear.

Still a further object of the present invention resides in the provision of a toothed connection between a shaft and a gear which enables torsional yielding of the shaft substantially within the entire area of the teeth thereof.

Still another object of the present invention resides in the provision of a tooth configuration for use with a non-rotatable connection between a shaft and the hub of a gear which not only increases the effective length of the shaft that may yield torsionally in case of abnormally high torques more or less instantaneously applied thereto, but which also permits a reduction of peak stresses that occur within localized areas of the toothed connection.

These and other objects, features and advantages of the present invention will become more obvious from the following description when taken in connection with the accompanying drawing which shows, for purposes of illustration only, two embodiments in accordance therewith, and wherein:

FIGURE 1 is a perspective view of a shaft section with a tooth profile or cross section in accordance with the present invention for alternating torques of equal magnitude;

FIGURE 2 is a partial plan view of the unfolded outer surface of the shaft of FIGURE 1; and FIGURE 3 is a partial plan view of the unfolded outer surface of the shaft of a modified embodiment of the tooth construction in accordance with the present invention.

Referring now to the drawing wherein like reference numerals are used throughout the various views to designate like parts, and more particularly to FIGURES 1 and 2, the shaft illustrated therein is provided at the end thereof with teeth generally designated by reference numeral 10 and extending over a predetermined length which engage with the internal teeth 15, one of which is shown in the partial views of FIGURES 2 and 3, provided in the hub of a gear (not shown) slipped over the shaft end and therewith non-rotatably connects the pinion or gear with the shaft. This shaft is intended to transmit a torque changing in magnitude and direction whereby the maximum torque in this embodiment has the same magnitude in both directions of rotation. The tooth construction of the shaft includes teeth 12 and tooth gaps 13 extending along the shaft axis 11 which become continuously wider in the direction of the arrow starting from the shaft end 14 carrying the gear, as may be seen particularly clearly from the exaggerated showing thereof in FIGURE 2. Since the internal toothed configuration of the hub of the gear includes teeth 15 of constant width, whereby this tooth width corresponds to the tooth gaps at the shaft end 14, there results for the teeth of the gear hub a flank play that increases continuously along the shaft in the direction of the arrow.

The tooth gaps 13 are produced by a profile cutter 16, the axis of rotation 17 of which intersects in the projection the shaft axis 11. The plane of symmetry 18 of the tooth gaps 13 thus contains the shaft axis 11. The feed direction 19 of the work tool subtends an acute angle α with the shaft axis 11. The tooth gap 13 therefore becomes deeper and wider from one end to the other of the toothed configuration 10 and the straight line 20 which is constituted by the center points of the profile bottom is inclined with respect to the shaft axis 11 by the same angle α, the distance a being larger than the distance b (FIG. 1).

If no torque is transmitted, then the hub and shaft teeth abut against one another only at the shaft end 14 and a flank play results within the remaining toothed area 10 that is equally large on both sides of the teeth. If a torque is transmitted from the shaft to the gear hub or vice versa, then within increasing torque, the flank play on one side of the tooth is decreased. The feed direction 19 and the tooth gap enlargement resulting therefrom is so selected that with maximum torque, the tooth flanks of one tooth side just abut over the entire length thereof, as indicated in dash and dot line in FIGURE 2 illustrating the abutting position of the hub teeth. In case of change in direction of the torque to be transmitted, the tooth flanks are lifted off and instead the tooth flanks of the other tooth side come into abutment, as may be the case with a shock-like starting of a motor vehicle in the forward and reverse speed.

FIGURE 3 illustrates a section of the unfolded outer surfaces of a shaft for the transmission of an alternating torque which is differently large in the two directions of rotation, for example, for axle drive shafts of motor vehicles in which a different transmission ratio exists for the lowest forward speed and the reverse speed. The feed direction of the profile cutter used for the manufacture of the teeth thereby extends in a skew manner to the shaft axis; that is, it forms acute angles with the shaft axis in two mutually perpendicular planes. The associated tooth construction of the gear hub has, as in the case of FIGURES 1 and 2, teeth and tooth gaps extending parallel to the shaft axis. The flank play of the hub teeth 15 is therefore differently large on the two sides of these teeth, corresponding to the different maximum torques in the two directions of rotation.

Conventional means including conventional profile cutters may be used for machining the teeth in accordance with the present invention, it only being necessary that the feed direction be controlled as described hereinabove by any conventional known means.

While I have shown and described two embodiments in accordance with the present invention, it is understood that the same is not limited thereto but is susceptible of numerous changes and modifications as known to a person skilled in the art. Thus, in order to achieve the same effect, the tooth construction of shaft and gear hub may, of course, be interchanged with one another in both embodiments described hereinabove.

Thus, it is obvious that the present invention is not limited to the details shown and described herein, and I, therefore, do not wish to be limited thereto, but intend to cover all such changes and modifications as are encompassed by the scope of the appended claims.

I claim:

1. A gear profile for the connection of a cylindrical shaft with the hub of a gear or the like, especially for the non-rotatable connection of the axle shaft of a motor vehicle with a driving gear, comprising: a plurality of teeth on said hub of a gear extending substantially in the longitudinal direction thereof, tooth gap means on said axle shaft engaging with said teeth on said hub of a gear and providing for relative motion between said shaft and hub of a gear in the circumferential direction as well as the radial direction of said shaft to an increasing extent from an end of said shaft, over a portion of said shaft engaging with said hub of a gear.

2. A gear profile for the connection of a cylindrical shaft with the hub of a gear or the like, especially for the non-rotatable connection of the axle shaft of a motor vehicle with a driving gear, comprising: tooth means on said shaft and said hub of a gear, said tooth means extending substantially in the longitudinal direction of said shaft, said tooth means defining tooth gaps therebetween, said hub of a gear being arranged at one end of said shaft, said tooth gaps on said shaft continuously decreasing in width in the direction of said one end of said shaft, said tooth means spaced about the periphery of said shaft correspondingly widening continuously in the direction of said one end of said shaft, said tooth gaps having a plane of symmetry, said plane of symmetry including therein, the longitudinal axis of said shaft, said tooth means on said hub of a gear being of a substantially uniform width, said width being slightly less than the width of said tooth gaps on said shaft at the end of said shaft where said tooth gaps are narrowest, whereby said tooth means on said hub of a gear contact the edges of said tooth gaps only at the end of said shaft when said tooth means are engaged, in the absence of a torsional force acting upon said shaft.

3. A gear profile according to claim 2, wherein the width of said tooth gaps on said shaft increases to a greater extent on one side of the axis of said shaft than on the other side of said axis, whereby provision is made for greater torsional stress in one direction.

4. A gear profile according to claim 2, wherein the depth of said tooth gaps on said shaft decreases continuously in the direction of said one end of said shaft.

5. In a non-rotatable connection between a shaft and another element, especially a non-rotatable connection between the axle shaft of a motor vehicle and the hub of a driving gear by means of mating teeth on said shaft and said hub of said driving gear, and tooth gaps included between said teeth, said teeth and said tooth gaps extending substantially in the longitudinal direction of said shaft, the improvement essentially consisting of tooth gaps, provided in said shaft, engaging with said teeth on said hub of a gear and providing for relative motion between said shaft and said hub of a gear in the circumferential direction to an increasing extent from an end of said shaft, over a portion thereof, said hub of a gear being arranged at one end of said shaft and the width of said tooth gaps on said shaft continuously decreasing in the direction of said one end of said shaft, said tooth gaps on said shaft widening to a greater extent on one side of the axis of said shaft than on the other side of said axis, whereby provision is made for greater torsional stress in one direction.

6. In a non-rotatable connection between a shaft and another element, especially a non-rotatable connection between the axle shaft of a motor vehicle and the hub of a driving gear by means of mating teeth on said shaft and said hub of said driving gear, and tooth gaps included between said teeth, said teeth and said tooth gaps extending substantially in the longitudinal direction of said shaft, the improvement essentially consisting of tooth gaps, provided in said shaft, engaging with said teeth on said hub of a gear and providing for relative motion between said shaft and said hub of a gear in the circumferential direction as well as the radial direction of said shaft to an increasing extent from an end of said shaft, over a portion thereof, said hub of a gear being arranged at one end of said shaft and the width and the depth of said tooth gaps on said shaft continuously decreasing in the direction of said one end of said shaft.

7. The combination according to claim 6, wherein the width of said tooth gaps on said shaft increases to a greater extent on one side of the axis of said shaft than on the other side of said axis, whereby provision is made for greater torsional stress in one direction.

(References on following page)

References Cited

UNITED STATES PATENTS

| | | | | |
|---|---|---|---|---|
| 1,803,995 | 5/1931 | Chilton | | 287—53 |
| 1,905,277 | 4/1933 | Ewert | | 287—53 X |
| 1,905,278 | 4/1933 | Edgar | | 287—53 X |
| 2,038,554 | 4/1936 | Edgar | | 287—53 |
| 2,590,169 | 3/1952 | Fritz | | 64—1 |
| 3,180,169 | 4/1965 | Wildaber | | 74—411 |

HALL C. COE, *Primary Examiner.*